Aug. 30, 1949.　　　　　　　E. BENNETT　　　　　　2,480,315
METHOD AND APPARATUS FOR MAKING
PIPE BENDS AND THE LIKE
Filed Aug. 17, 1946　　　　　　　　　　　　　　7 Sheets-Sheet 1
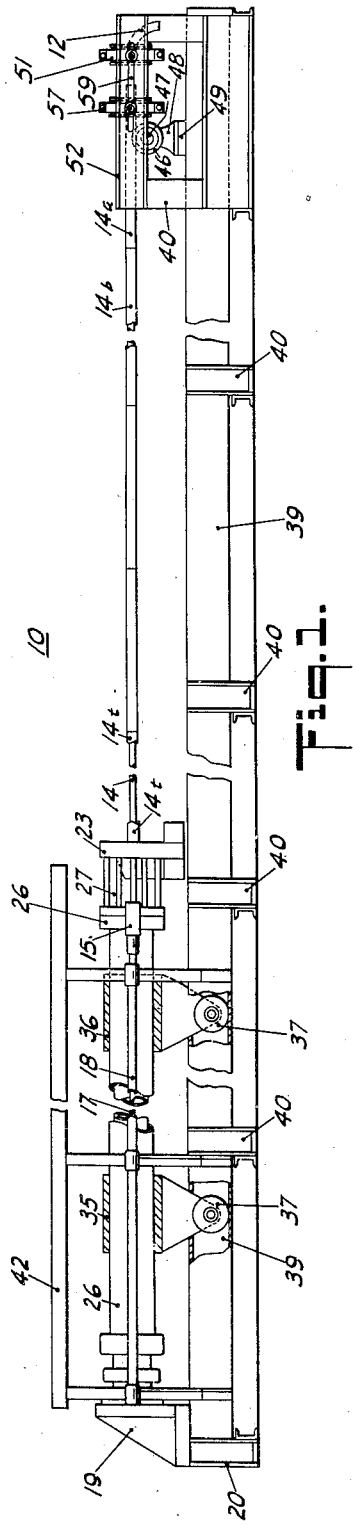
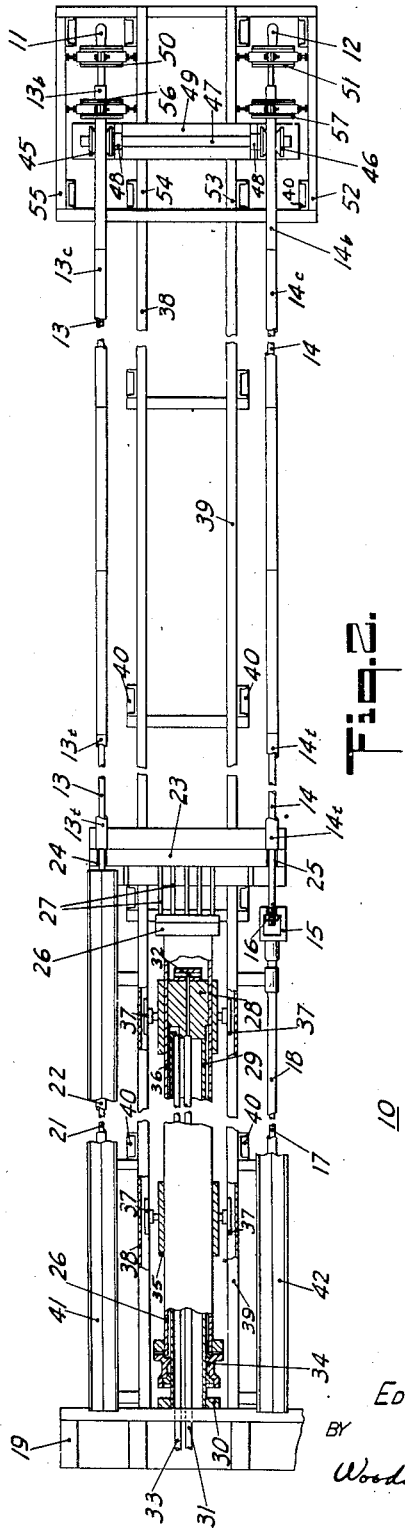
INVENTOR
EDWARD BENNETT
BY
Woodcock and Phelan
ATTORNEYS INVENTOR
EDWARD BENNETT
BY Woodcock and Phelan
ATTORNEYS INVENTOR
EDWARD BENNETT
BY
Woodcock and Phelan
ATTORNEYS INVENTOR
EDWARD BENNETT
BY
Woodcock and Phelan
ATTORNEYS INVENTOR.
EDWARD BENNETT
BY
Woodcock and Phelan
ATTORNEYS Aug. 30, 1949.  E. BENNETT  2,480,315
METHOD AND APPARATUS FOR MAKING
PIPE BENDS AND THE LIKE Filed Aug. 17, 1946  7 Sheets-Sheet 7

INVENTOR
EDWARD BENNETT
BY
Woodcock and Phelan
ATTORNEYS

Patented Aug. 30, 1949

2,480,315

UNITED STATES PATENT OFFICE 2,480,315

METHOD AND APPARATUS FOR MAKING PIPE BENDS AND THE LIKE

Edward Bennett, Madison, Wis., assignor to Tube Turns, Inc., a corporation of Kentucky Application August 17, 1946, Serial No. 691,295

14 Claims. (Cl. 219—3)

This invention relates to methods of and systems for making curved tubes from straight tubular blanks by forcing them in succession over a mandrel, and has for an object the provision of a method and system for efficiently and rapidly producing curved tubes or pipe fittings at a high rate with a minimum, if any, rejects.

For a number of years, apparatus of the type disclosed in the patents to Bohling No. 1,648,161, Gaum No. 2,176,961, and Zoeller No. 2,246,029, have been utilized in the manufacture of curved tube fittings. In accordance with each of the patents, a substantial number of pipe blanks carried by a rod, one end of which is fixed and the other end of which has attached thereto a mandrel, have in succession been forced over the mandrel to form them into the desired shape. The pipe or tube blanks, generally of carbon steel, must be first heated to a relatively high temperature and one at which the metal may be successfully shaped by the mandrel. Curved pipe or tube blanks shaped in this manner vary in size from a small diameter of the order of one-half inch, to a very large diameter, of the order of twenty-four inches, with wall thicknesses as low as 0.065 inch and above 1½ inches. The curved tube fittings or return bends are widely used in refineries and in every application where piping is needed. Seamless fittings of uniform thickness throughout the curved portion are in many applications required by specifications and are to be preferred in most applications.

It has heretofore been the practice to arrange the pipe blanks for movement through a furnace, which has heretofore been of the open-air type. It consists of an open-ended chamber into which the mandrel and the tube blank moving thereover project. One or more gas burners supported some four or five feet away from the chamber direct streams of burning gases over the tube blanks and into the chamber. Though the arrangement has been satisfactory, great care must be exercised in the adjustment of the burners, including both the rate of fuel supply and the positioning of the flames on the tube blanks, and there must be relatively precise correlation between the rate of movement of the tube blanks over the mandrel and the rate of heating. To obtain the proper correlation of the variables, it has been necessary that the operator closely watch the tube blank passing over the mandrel. He must judge the temperature by the color of the heated blank and in general rely upon his own experience in properly correlating the many variables. Moreover, for inspection purposes and because heat is applied to one side of the pipe largely by radiation from the back wall of the furnace, it is required that each tube blank be moved upwardly around the mandrel in order that the furnace may be close to the back of the tube blank. This of course means that the leading end of each blank will curve back into the heating flames. The leading end is unnecessarily raised in temperature, frequently causing scale to form on it, and the returning curved end also forms a shield which reduces the heat input to the remainder of the tube blank and to the following tube blank.

The radius of curvature of each pipe fitting must be accurately maintained. In order to form a 180° fitting or return bend, a straight tube blank must be bent through a greater arc to allow for cropping and the finishing of the ends. The wall thickness of such a tube blank must not vary more than 12½ per cent from its desired final value, and the variation should be less. The inside diameter of the pipe fitting, for a 2½ inch bend, must not vary more than $\frac{1}{32}$ inch in either direction, and for fittings 20 inches in diameter and larger the inside diameter must be maintained to within $\frac{1}{16}$ inch, either way. The outside diameters must be held to substantially the same specifications. There should not be any twist in the bend; certainly not exceeding 1°. If the gas furnace elevates the temperature of any part of the carbon steel tube blanks above 1650° F., subsequent, and expensive, heat treatment or annealing becomes necessary and the life of the mandrel is shortened, to say nothing of the need to remove hard scale formed on the tube blank. Since one tube abuts against the other, to force the leading tube blank over the mandrel, the blanks may not be preheated to a temperature where they may buckle or override the leading tube. This requires that a predetermined desirable heat pattern in the vicinity of the mandrel be closely maintained.

In carrying out the present invention in one form thereof, there have been eliminated the gas-fired furnaces and all of the problems incident to their use. Instead of heating the tube blanks by externally applied gas flames, heat is generated throughout the wall thickness of each tube blank and around the circumference of each tube blank. The heat is not only generated throughout the wall thickness of each tube blank but the rate of heat generation per unit of time is definite and is not subject to uncontrollable variables. More particularly, a heating coil is disposed around the tube blank in the vicinity of the trailing end of the mandrel. This heating coil, which when suitably energized produces an alternating magnetic field, is utilized to induce heating currents of magnitude and having characteristics which quickly and efficiently generate heat throughout the wall thickness of the tube blank and which to some extent heat the mandrel disposed therein. Accordingly, there need be correlated only the power input to the coil and the speed of movement of the pipe blank through the coil to insure that the tube blank will be heated to its plastic range; that is, it will be in the most desirable plastic condition as it is pressed over the mandrel.

The term "plastic range" as used in the specification and claims means that range of temperature of the material of the hollow metal articles or tube blanks which will cause it to flow and permanently change its shape by application of pressure adequate to force such articles or tube blanks over a mandrel of a desired and predetermined shape.

Further in accordance with the invention, the alternating magnetomotive forces produced by the heating coil are of such a magnitude as to produce within the blank changes of magnetic flux to and from high flux-saturation values at rates high enough to induce in the blank current impulses of large magnitude as well as a shielding effect which has the beneficial result of materially increasing the power input to the blank and the rate of generation of heat in the blank; and which also minimizes or decreases the heating of the mandrel.

For a more detailed understanding of the invention, and for further objects and advantages thereof, reference is to be had to the following description taken in conjunction with the accompanying drawings, in which:

Fig. 1 is an elevation, partly in section, of an apparatus to which the invention has been applied;

Fig. 2 is a plan view of the apparatus of Fig. 1, partly in section and with some parts cut away, the better to show some features of construction;

Fig. 5 is a sectional view illustrating more in detail one preferred construction of the heating coils;

Figure 8:
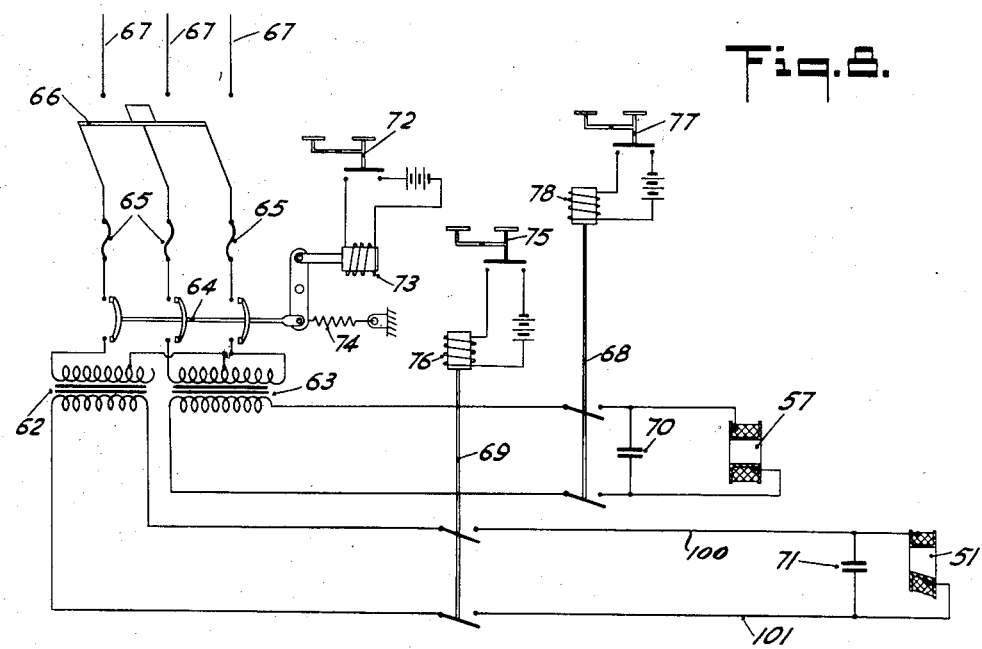
Figure 9:
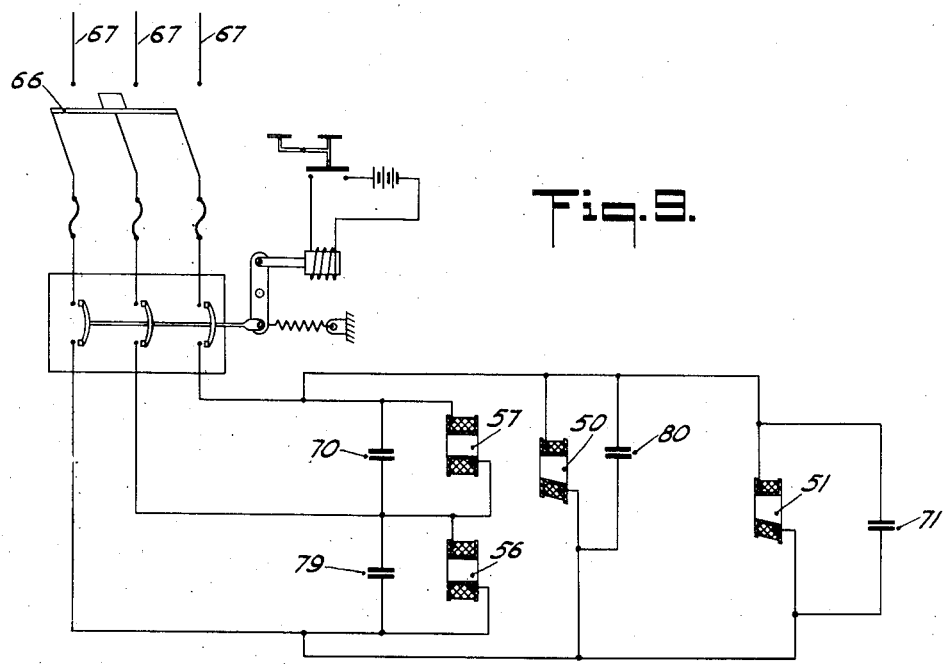
Figure 10:
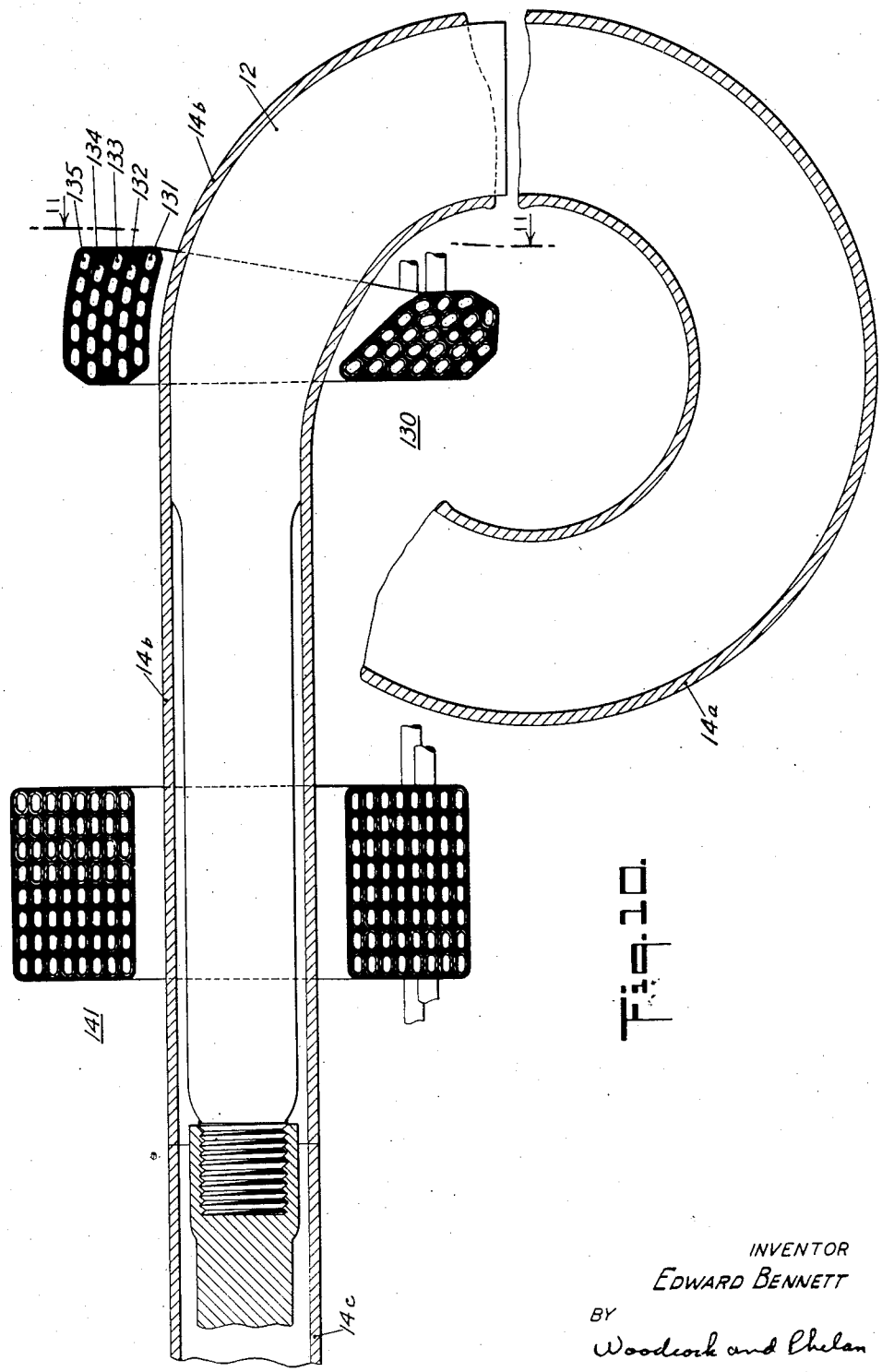
Figure 11:
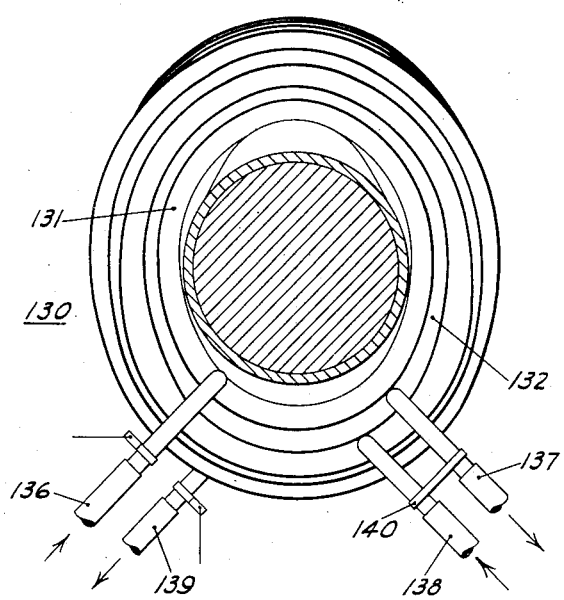

Fig. 8 diagrammatically illustrates a typical wiring diagram;

Fig. 9 illustrates another typical wiring diagram;

Fig. 10 is a sectional elevation of a further modification of the invention;

Fig. 11 is a sectional view, taken on the line 11—11 of Fig. 10; and

Figures 12, 13, 14:
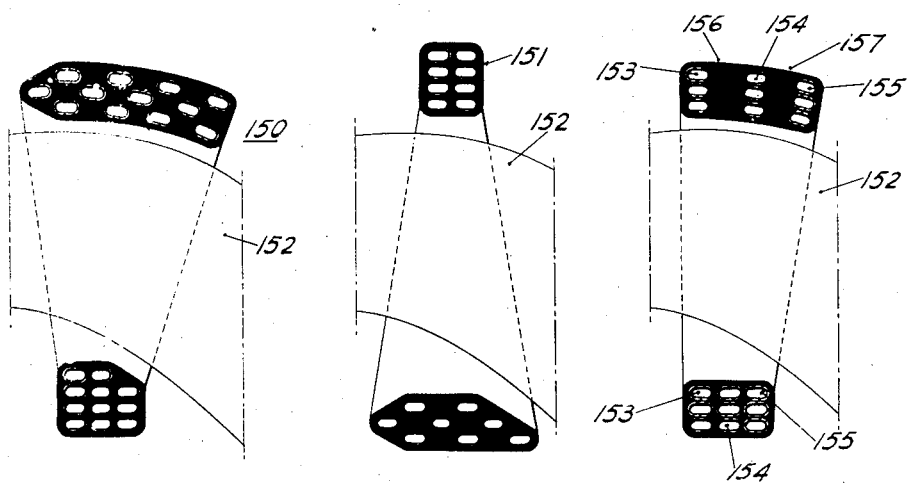

Figs. 12, 13, and 14 diagrammatically illustrate further modifications of the invention.

Before describing the method and structure to which the invention primarily relates, a brief description will be given of the press and the manner in which it operates. There is illustrated, in Figs. 1 and 2, a press 10 of the type fully described in Gaum Patent No. 2,176,961 and Zoeller Patent No. 2,246,029, and reference may be had to those patents for additional details. The press is utilized to force tube blanks over mandrels in order to shape the tube blanks to a desired configuration. The press 10 may serve one mandrel or a number of mandrels. As shown in Fig. 2, two mandrels 11 and 12 are provided. They are attached to corresponding ends of the tie-rods 13 and 14. The opposite ends of the tie-rods are disposed within box couplings of identical construction, only one of which, the coupling 15, is shown. The end of the tie-rod 14 is provided with a nut 16 which is disposed within the box coupling 15. The coupling itself is secured to a tie-rod 17 which extends through a cylindrical guide 18 suitably supported from the frame. The rod 17 is anchored to a stationary end-support 19 which, through a plurality of uprights 20, forms a part of the frame. A tie-rod 21 is also secured at one end to the support 19, and at its other end to the box coupling (not shown) provided for rod 13. The rod 21 passes through a cylindrical guide 22. A plurality of tube blanks are supported on the tie-rods 13 and 14, and the trailing tube blanks 13t and 14t have their trailing ends in abutting relation with a crosshead or pusher bar 23 which, like the box 15, is provided with open-ended channels 24 and 25 wide enough to receive the tie-rods 13 and 14 but narrower than the diameter of the tube blanks 13t and 14t.

Upon movement of the crosshead or pusher bar 23 to the right, as viewed in Figs. 1 and 2, the tube blanks will engage each other and will be moved toward the mandrels 11 and 12. The pusher bar 23 is moved by and supported from the outer end of a movable cylinder 26 by means of a circular array of push rods 27. Within the cylinder 26 is a stationary piston 28 which has secured to it a tubular piston rod 29, the opposite end of which is secured to the end-support 19 as indicated at 30, Fig. 2. In order to move the cylinder 26 to the right as viewed in Figs. 1 and 2, there is provided a pipe 31 leading from a suitable source of hydraulic pressure and extending into communication with a flow channel 32 which extends through the piston and into the space between it and the end of the cylinder 26. The forced flow of hydraulic liquid into this space exerts a pressure between the stationary piston 28 and the head of the movable cylinder 26. Accordingly, pressure is applied through the push rods 27 and the pusher plate 23 to the tube blanks 13t and 14t and to the other tube blanks.

For return movement of the cylinder 26, suitable valve means are provided, though not shown, to transfer the flow of the hydraulic fluid to a pipe 33 which through a suitable port in the piston 28 introduces hydraulic liquid for application of pressure to the trailing end of the cylinder and against the trailing end of the stationary piston 28. To prevent loss of the hydraulic fluid, suitable packing glands 34 are provided.

The cylinder 26 is mounted for its reciprocatory movement by means of roller carriages 35 and 36, the rollers or wheels 37 of which ride upon tracks formed by channel members 38 and 39 which form a part of the frame and which are fastened to a plurality of additional uprights 40.

The apparatus as a whole is quite long, so that at initial loading a relatively large number of tube blanks may be supported on each of the tie-rods 13 and 14. To simplify the loading of the machine, a pair of troughs 41 and 42 are supported above the level of the cylinder 26. Tube blanks are placed in the troughs 41 and 42 during operation of the apparatus. Whenever reloading is desired, the rods 13 and 14 are lifted from their coupling boxes, for example the box 15, into alignment with the tube blanks in the respective troughs. The tube blanks may then be quickly transferred to the rods. A system of the type illustrated and described in said Gaum Patent 2,176,961 is preferred for fast loading of tube blanks on the rods. It may be further observed that the mandrels 11 and 12 and the tube blanks adjacent them are supported by means of rollers 45 and 46 carried by a shaft 47 supported by trunnions 48, Fig. 1. The trunnions 48 are carried by a frame member 49 which, it will be observed, is secured to the channel members 38 and 39.

A consideration of the structure thus far described will make evident the difficulty in providing a furnace for heating the pipe blanks to the proper temperature just prior to their passage over the shaping mandrels 11 and 12. Even though such furnaces have been utilized, the rate of heating of the tube blanks has been limited. More specifically, the temperature of the tube blanks cannot be increased in the ordinary type of furnace except by maintaining a higher temperature around the tube blanks, which of course insures transfer of heat to the tube blanks of lower temperature. It has heretofore been difficult to attain furnace temperatures much above 2500° F., for the reason that the furnace must be open for visual inspection purposes and also to allow the shaped tube blanks to be lifted from the furnace.

In accordance with the present invention, heat is generated throughout the thickness of each tube blank and circumferentially of the tube blank by means of alternating current induced therein by heating coils 50 and 51 respectively supported from channel members 52—55 forming a part of the frame. The coils 50 and 51 are adjustably supported adjacent the downturned ends of the mandrels 11 and 12. Though these coils may be utilized by themselves, the use of preheat coils 56 and 57 in addition is preferred. The preheat coils 56 and 57 adjustably supported from the channel members 52—55 are energized from a suitable source of alternating current and also serve to induce heating currents in the tube blanks. The respective coils 50, 51, 56 and 57 are supported by clamping bands from which there extend threaded rods. These pass through the slots provided in the members 52—55. The slots 59 are clearly shown in Fig. 1 together with the locking nuts which serve to clamp each coil in a predetermined position.

Figure 3:
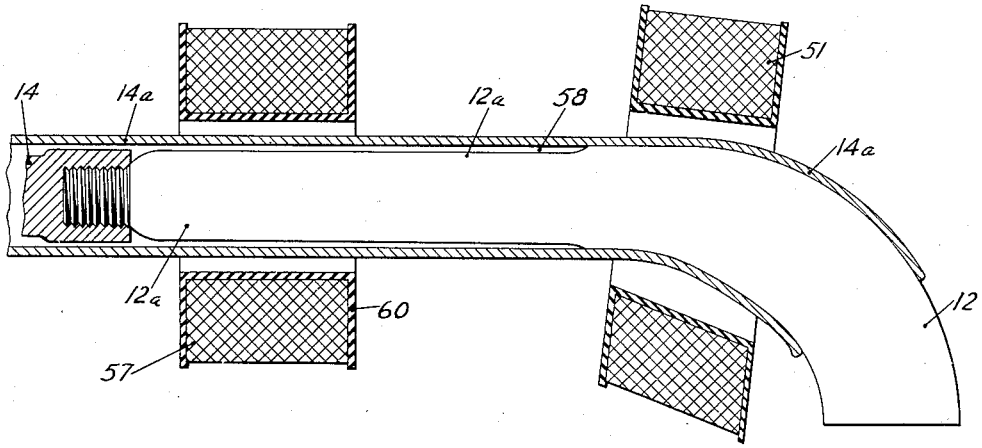
Fig. 3 is a sectional view of the mandrel and the manner in which the heating coils are located with respect thereto.

From the enlarged view, Fig. 3, it will be observed the mandrel 12 has a shank 12a of reduced cross-sectional area which leads to the tie-rod 14, to which it is secured as by threaded engagement therewith. By reason of the reduced cross-sectional area, an air space 58 is provided between the shank 12a of the mandrel and the tube blank 14a. The air space minimizes transfer of heat by conduction between the tube blank 14a and the shank 12a. The preheat coil 57 consists of a plurality of turns of a conductor, insulated one from the other and which as a whole is covered by heat-resistant insulating material 60. The alternating-current magnetic field produced by the coil 57 induces a current in the tube blank in the region or axial length disposed between the ends of the coil. Heat is generated uniformly throughout the circumference of the tube and along a substantial axial length thereof. While some heat is generated within the mandrel itself, the provision of the air space 58 minimizes conductive transfer thereto and there are other factors which also reduce it, as will be later explained in detail. The mandrel heating coil 51, though it may be disposed at right angles to the axis of the tie-rod 14, and as illustrated in Figs. 1 and 2, is shown in Fig. 3 to be disposed at an angle with respect thereto other than 90°. Additionally, the coil 51 is so constructed that the lower half of the coil as viewed in Fig. 3 is inclined at an angle to provide maximum clearance for a tube blank 14a. It will also be observed that the coil 51 extends over a part of the enlarged end of the mandrel 12. This arrangement insures some heating of the mandrel and is desirable since during the forming operation the mandrel 12 and the tube blank 14a in the bend-forming and shaping zone should be at approximately the same temperature.

Further in accordance with the invention, the tube blanks are heated to the desired forming or plastic temperature by energizing the preheat coils 56 and 57 and the primary or mandrel coils 50 and 51 from 60-cycle 440-volt or 220-volt alternating-current supply lines. The preheat coils 56 and 57 and the mandrel coils 50 and 51 may be connected in parallel across single-phase alternating-current supply lines, though in general it is more likely that three-phase alternating-current supply lines will be available. Accordingly, Fig. 8, there may be utilized a Scott connection of transformers 62 and 63, the primary windings of which are connected by means of a circuit breaker 64, fuses 65, and a disconnecting switch 66, to a suitable source of three-phase alternating-current supply indicated by the supply lines 67. The secondary winding of the transformer 63 supplies, under the control of a contactor 68, the energization of the preheat coil 57. Similarly, the secondary winding of the transformer 62, under the control of a contactor 69 supplies the energization for the mandrel coil 51. The power factor of the load comprising the inductive coupling to the pipe blank is relatively low. Therefore, capacitors 70 and 71 are respectively connected in shunt with the coils 57 and 51. Preferably, the capacitors are of a size to produce adequate improvement or correction of the power factor. In some cases, voltages of 220 volts may be preferred but since the cost per kva. of 440-volt capacitors at the present time is but half that of the 220-volt capacitors the higher voltage is preferred. Aside from such economic considerations, the voltage used is not critical.

In starting up the equipment and before movement of the tube blank 14a through the coils 57 and 51, the disconnect switch 66 is closed and the circuit breaker 64 is closed by repressing a push-button switch 72 which completes an energizing circuit for the operating coil 73 of the circuit breaker 64. A spring 74 or other means may be provided to open the circuit breaker 64 upon opening of the push-button switch 72 or in response to overload conditions in manner well understood by those skilled in the art. Assuming operation with a single mandrel 12, Fig. 3, and further assuming the mandrel to be cold, a push-button switch 75, Fig. 8, will be closed to energize the operating coil 76 of the contactor 69. The resultant closure of contactor 69 connects the mandrel coil 51 to the secondary winding of the transformer 62. The resulting flow of 60-cycle alternating current through the turns of the mandrel coil 51 will induce in the mandrel 12 flow of current which will generate heat therein. The mandrel itself is generally constructed of an austenitic steel, having a very low coefficient of heat conductivity. Accordingly, to produce a uniform temperature of the mandrel high enough to permit the forcing of a tube blank over it, a considerable heating time is required; for example, as much as 25 minutes. However, after energization of the mandrel coil 51, the tube blank 14a, Fig. 3, may be moved within the coil and pushed forward at a very slow speed. The higher rate of heating of the carbon steel tube blank assists in rapidly elevating the temperature of the mandrel. The speed of advance of the tube blank may be gradually increased as its leading end reaches a temperature of about 1400° F. By so utilizing the tube blank to conduct heat to the enlarged end of the mandrel within and beyond the coil, the whole assembly can be brought up to a working temperature in a relatively short time, several minutes, in contrast with the 30-minute heating period heretofore required with gas-fired furnaces. A further reduction in starting time may be realized by leaving the last tube blank of a run on the mandrel and utilizing it to hasten the heating of the mandrel during the warming-up operation. In this manner, the mandrel coil need be energized for only a minute or so before starting a run. The presence of the tube blank and the greater conductivity of the carbon steel produce a tube temperature of 1400° F. much more quickly than without it, and the time required for the assembly to reach the operating temperature is in the neighborhood of 4 minutes. After the desired operating temperature has been attained, or after the first tube blank leaves the mandrel 12, the preheat coil 57 is energized by closure of a push-button switch 77 which energizes the operating coil 78 of the contactor 68. At this time, the speed of the tube blanks may be rapidly increased to that desired for a particular run.

It is to be understood that the preheat coil 57 was not and should not be energized until the mandrel 12 and the leading tube blank had been heated to a relatively high temperature. It is necessary that the leading tube blank shall not offer greater resistance to forward movement than the strength of the following blank; otherwise, the following tube blank would buckle and deform. The requirement is that there be a gradient of temperature so that the circumferential portion of the tube blank passing over the enlarged tube-forming section of the mandrel shall be at its best shaping or plastic temperature while the following portion of the tube blank and the tube blank behind it shall be at a lower temperature. An understanding of this requirement is important and indicates how the present process differs over forging methods where each blank is heated as a whole to the forging temperature and then placed within dies for the forging operation. In contrast, according to the present method the entire tube blank is shaped and formed but the heating and shaping thereof is progressive from one end of the blank to the other.

To assist in understanding the manner in which each tube blank progresses over the mandrel 12, the illustrations of the several modifications of the invention have been utilized to show the formation of a fitting from the position of the tube blank 14a of Fig. 3 until the complete formation of the fitting. For example, the tube blank 14a of Fig. 3 is moved over the mandrel 12 by the force exerted on its trailing end by the following tube blank 14b, Fig. 4. The curvature of the mandrel 12 and its configuration as a whole is such as to appreciably expand the tube blank 14a and to impart to it a curvature of desired radius. In general, this radius is normally equal to or 50 per cent greater than the nominal diameter of the fitting. As shown in Fig. 5, the tube blank 14a has been formed into a return bend of approximately 220°. It will also be observed that the inner portions of the tube blanks 14b and 14a abut each other, while there is a space between the outer portions, or along the outer radius of the mandrel 12. There is sufficient tube-area in contact for transmission of the necessary force to continue movement of the tube blank 14a over the mandrel 12. It will also be observed in Fig. 5 that the third tube blank 14c is illustrated as applying the force or pressure from the hydraulic drive to the tube blanks 14b and 14a.

In Fig. 10, it will be observed that the tube blank 14a has been moved from the end of the mandrel 12. It simply drops off the end. It may land on the floor, a short distance below it, where it is removed for cooling and later finishing. It is finished by suitably cropping the ends to eliminate the deformed and flaring sections and to provide a 180° bend or fitting of uniform curvature, thickness, and generally uniform dimensions.

As the shaping of the tube blank 14a is completed, it will be seen that the tube blank 14b has already been partly shaped and that the tube blank 14c is moving into the preheat coil. In this manner, one tube blank after the other is shaped by the mandrel 12. There is no interruption in the operations until it is necessary again to load the guide rods. It is to be further observed that an operator may stand to the right of the mandrel, as viewed in Figs. 1 and 2, and that he will have an unobstructed view of each tube blank as it passes downwardly and over the mandrel 12. He can watch the progress of each tube blank, make necessary corrections in the speed of operation, and otherwise be fully informed at all times as to the operation. There is no shielding of the bend-forming zone nor overheating of the formed bend.

Should there be a tendency for the tube blank to warp, that is, to twist and not to be curved in the plane of the mandrel, the operator may, by directing a stream or streams of cool air against one side or the other of the tube blank, cause it to return to its true toroidal shape. Though such a procedure need not ordinarily be utilized, it is feasible and practical in conjunction with the present invention; whereas, such a means could not be utilized in accordance with prior practice.

The foregoing description of operations assumes the use of a single mandrel 12. As shown in Fig. 2, the two mandrels 11 and 12 may be simultaneously used. A suitable wiring diagram for the apparatus of Fig. 2 has been illustrated in Fig. 9 where the respective coils 57 and 51 have been shown with capacitors 70 and 71 connected in shunt therewith. Similarly, the preheat coil 56 is provided with a shunt capacitor 79, while the mandrel coil 50 is provided with a shunt capacitor 80. The preheat coils 56 and 57 and their associated capacitors are respectively connected to two phases of the three-phase supply, while the mandrel coils 50 and 51 and their associated capacitors are connected in parallel across the third phase of the three-phase source of supply. In this manner, balanced operation is obtained.

The three phases carry substantially the same load. Figs. 8 and 9 are intended to be suggestive, and in Fig. 9 certain of the circuit-controlling contactors have been omitted though it is to be understood they may be utilized and operated in manner described in connection with Fig. 8. It is to be further understood that where more than two mandrels are utilized, additional secondary windings may be provided to supply the additional mandrel and preheat coils.

Figure 4:
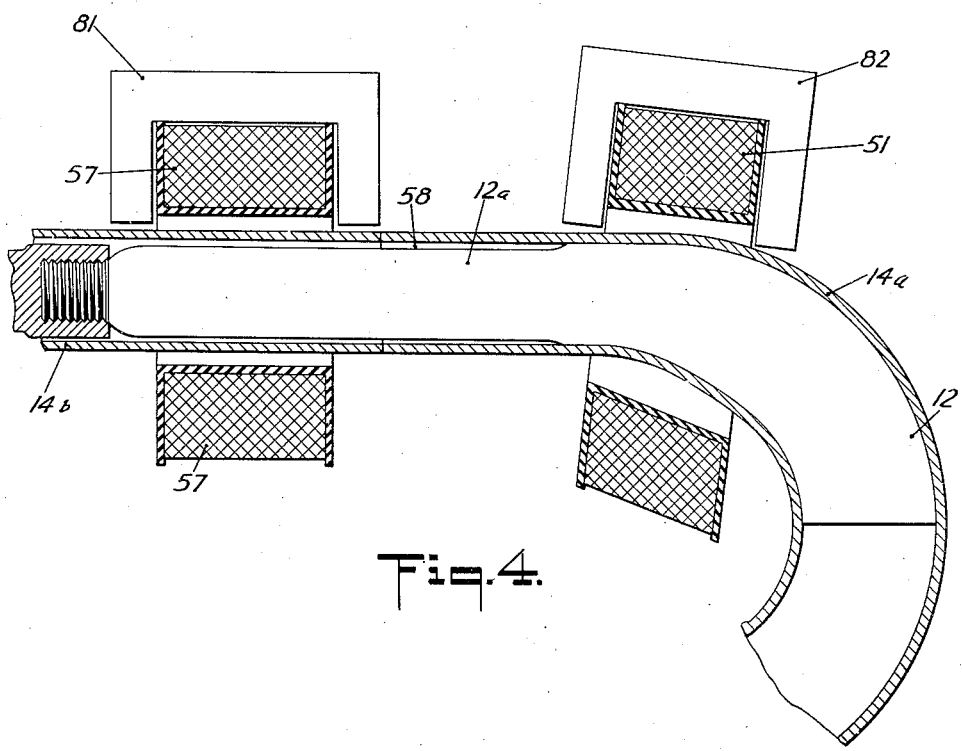
Fig. 4 is a sectional view, similar to Fig. 3, of a modified form of the invention.

As shown in Fig. 4, the preheat coil 57 may in part be surrounded by a plurality of laminations 81 of transformer iron or steel. Similarly, the mandrel coil 51 may be surrounded, at least in part, by laminations 82 also of transformer iron or steel. The laminations increase the intensity of the magnetic field applied to the tube blank 14a and to the mandrel 12, and raise the efficiency of power transfer to the tube blank.

In the description so far, it has been more or less assumed that the desired magnitudes of heating currents were produced by the preheat coil and by the mandrel coil. The heating currents must be high enough to generate heat within the tube blank at rates high enough to elevate its temperature to the point where at the enlarged forming section of the mandrel it will be within its plastic range. From theoretical considerations and on the basis of prior practice with gas-fired furnaces with ferromagnetic materials, the temperature should be approximately 1400° F. Thus, with the tube moving over the mandrel at a desired speed, each section of the tube blank as it arrives at the mandrel must be heated to within its plastic range which includes the temperature of 1400° F. Heat must be generated at one rate for a speed of 4 inches per minute, and at a higher rate for a speed of 12 inches per minute. At the higher rate, and for desired speeds of 40 inches per minute, and more, the rate of rise in temperature of the tube blank must be materially higher than the rates attainable with present gas-fired systems, and the heat input or generation of heat must be restricted to a predetermined axial length of the tube blank. The requirement is that there shall be transfer to a limited axial length of the tube blank of energy at a rate which will heat the tube blanks to the required plastic range, as has already been outlined.

To produce heat at the desired rate and for a speed of 40 inches per minute requires the production of exceedingly high magnetizing forces or magnetomotive forces. These magnetomotive forces will require large currents to flow through each coil to produce a product of the amperes of current times the turns of the coil of the order of 200,000. The physical dimensions of the coil, particularly the mandrel coil, are limited since each tube blank forms a return bend with the leading end of the blank partly encircling the lower half of the heating coil 51, Figs. 5 and 10. Moreover, the tube blank itself is heated to a substantially bright red heat, and accordingly the radiation of heat from the tube blank to the mandrel coil 51 is considerable. In fact, heat insulation, as shown, must be provided, Fig. 5, between the first row 83 of conductors and the tube blank 14b. Additionally, there must be an air space between the heat insulation and the tube blank 14b. The air space, of the order of from ⅛ inch to ½ inch has been exaggerated in Fig. 5 for both of the coils 51 and 57. While the inner diameter of the mandrel coil 51 is limited by the foregoing considerations, it will be seen from Fig. 5 that the outer diameter is limited by the radius of curvature of the tube blank 14a after it has passed over the mandrel 12. Similarly, the axial width of the coil is also limited by the diameter of the curved tube blanks 14a and 14b after their passage over the mandrel 12.

In accordance with the invention, the mandrel coil 51 is provided with an optimum number of turns and the shape or configuration of the coil and of the individual conductors thereof have been provided for high efficiency; that is, to minimize losses and to insure maximum induction of heating current to the tube blanks. The power or $I^2R$ losses in the coil are due to the flow of current along the turns or conductors of the coil. The effective resistance of the coil is not the direct-current resistance value. The effective resistance value is several times its direct-current value for the reason that the inner turns of the coil are cut by the magnetic lines of force produced by current flowing in the outer turns of the coil. This effect decreases from the inner layer 83 through layers or rows 84—89. To minimize the eddy current losses, it will be observed that the conductors have been flattened; that is, they are more or less rectangular in cross section with the dimension radially of the coil materially less than the dimension axially of the coil.

Figure 7:
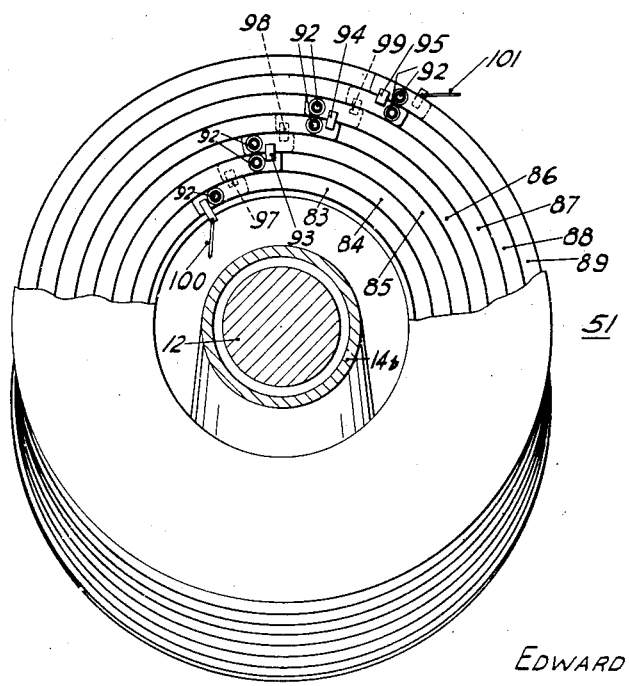
Fig. 7 is a sectional view taken on the line 7—7 of Fig. 5, with certain parts cut away.

The heat losses in the coil and the heat radiated thereto from the tube blank 14b require an effective cooling system, which means the circulation of a coolant through the coil, such for example as water. Accordingly, there are provided hollow conductors with the flow passages large enough for flow of the necessary cooling water without application of excessive fluid pressure thereto. To meet these severe requirements, the coil 51 is formed of a plurality of rows or layers of conductors, each row or layer of which is wound or formed from a single length of tubing. Round tubing flattened into an elongated oval shape, Fig. 10, may be utilized, or rectangular tubing of the type illustrated in Fig. 5 will be satisfactory. By making each row or layer independent of adjoining layers, each layer may be provided with inlet pipes 91 and outlet pipes 92 for circulation of cooling water in parallel or multiple paths through the various rows or layers of the coil. While the conductors of the coil are connected in parallel for fluid flow, the adjacent layers are electrically connected in series. As shown in Fig. 7, straps 93, 94, and 95 electrically interconnect corresponding ends of the layers 84—85, 86—87, and 88—89. At the opposite ends of the respective layers, straps 97—99 respectively interconnect the ends of layers 83—84, 85—86, and 87—88, leaving a free end on the near and remote sides of the coil 51 as viewed in Fig. 7 for the layers or rows 83 and 89, which free ends are connected, as by strap-conductors, to the source of current supply; such, for example, as the conductors 100 and 101, Figs. 7 and 8.

It will be observed, Fig. 7, that the coolant outlet openings 92 adjacent the respective ends of the coil of each layer are staggered with respect to each other. This staggered relation of the ends of the coil-layers provides needed spacing of the outlets 92 and by a like staggering arrangement needed spacing for the inlets for connection thereto of rubber hose or other insulating tubular members for flow of the cooling water to and from the coil.

Figure 6:
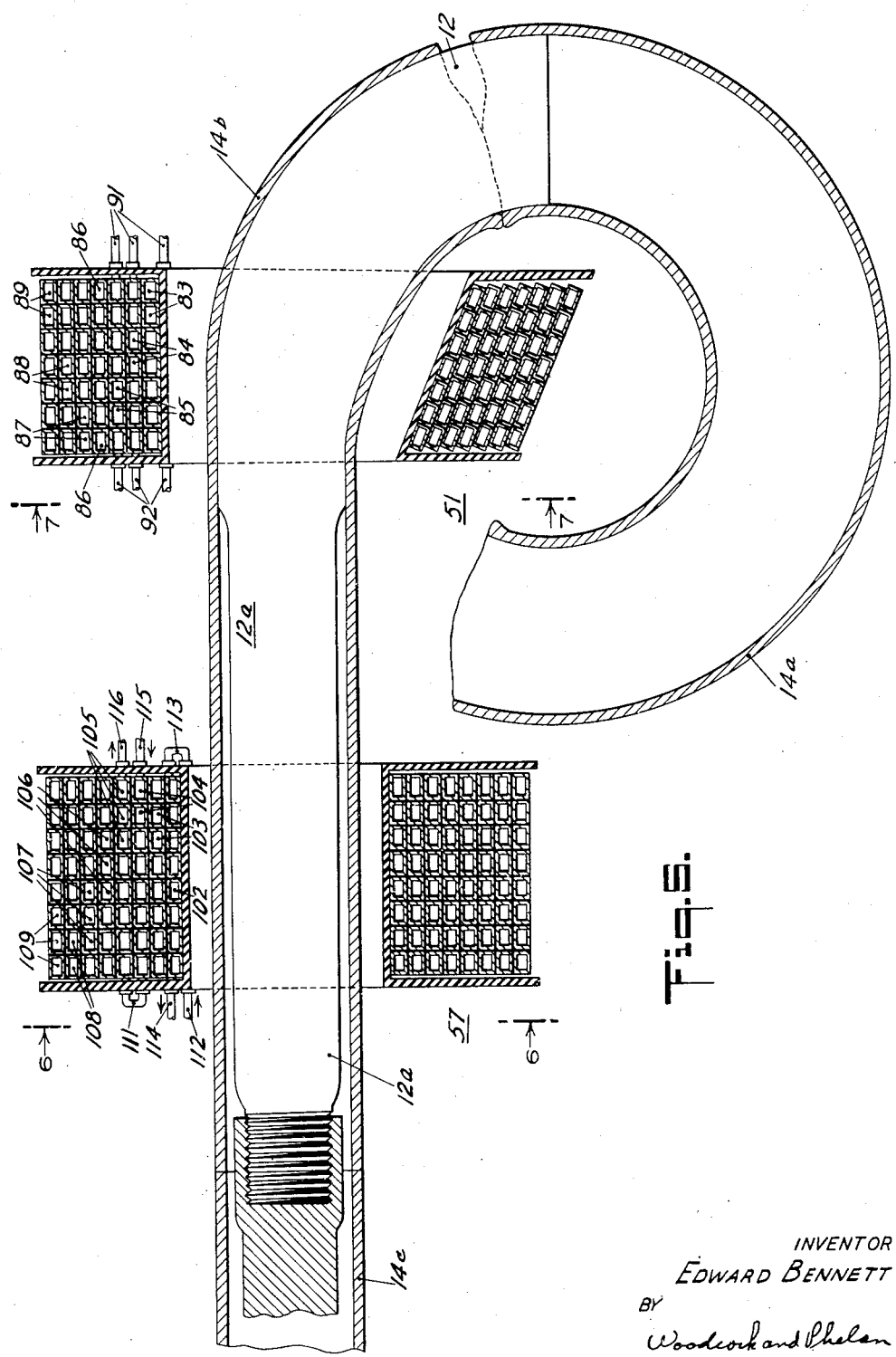
Fig. 6 is a sectional view taken on the line 6—6 of Fig. 5, with certain parts cut away.
Figure 6:
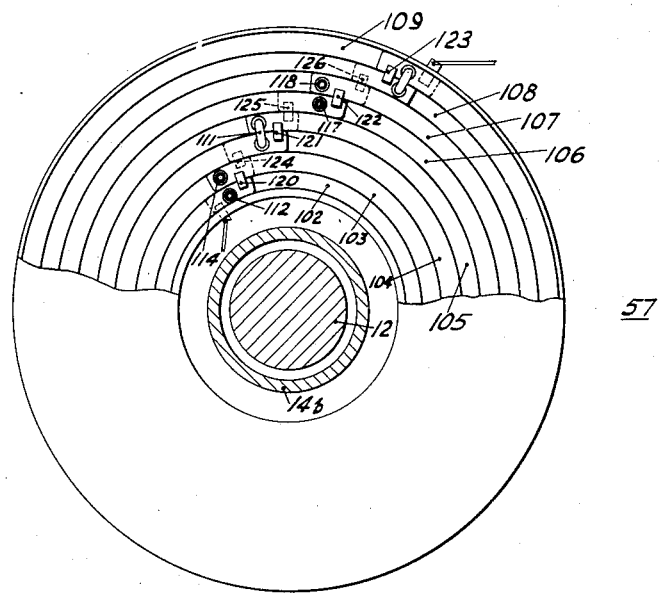

The preheat coil 57, Figs. 5 and 6, is of generally like construction, though instead of the partly frusto-conical shape imparted to the mandrel coil 51 the preheat coil 57 is of cylindrical shape. Though water may be circulated in parallel streams through the respective layers 102—109, one or more layers may be connected in series. For example, water or other coolant may be introduced through an inlet pipe 112 and after passing through the turns of the layer 102 it may be redirected by a return bend 113 at the opposite end of the coil for flow through the respective turns of the layer 103, leaving the coil through the outlet 114. Similarly, water entering through an inlet 115 at the opposite end of the coil goes through the layers 104, through the return bend 111, through layer 105 and leaves by way of an outlet 116 on the opposite end of the coil. The layers 106 and 107 are cooled by water circulating through inlet 117 and outlet 118. Similar inlets and outlets are provided for the layers 108 and 109. Where the flow passages are larger, or where the cooling requirements are lower, additional layers of the coil may be connected in series relation for flow of the coolant. Of course, a series connection for all turns and layers may be used where adequate pressure is applied to insure circulation of the required quantity of water or other coolant. In general, it is desired to minimize the pressure necessary to circulate water in amount which will produce the desired cooling action without formation of steam.

As in the case of the mandrel coil 51, the preheat coil 57 has the several layers thereof connected in series-circuit relation by means of conductor-straps 120—123 located on the near side of the coil as viewed in Fig. 6, and by conductor-straps 124—126 located on the far side of the coil as viewed in Fig. 6.

Some of the limitations in the design of the mandrel coil 51 have already been discussed. Since the space which the mandrel coil 51 can occupy is limited by the size of the pipe blank and the radius of curvature after passing over mandrel 12, there remains the problem of selecting the number of turns to be used as well as the proper dimensions for the conductor forming each layer. Ideally, it would be desirable to increase the thickness of each layer, starting with the inner layer. As a practical matter, and as shown in Fig. 5, the layers are made of conductors of uniform thickness and insulated one from the other. A satisfactory preheat coil for pipe blanks to produce a tube fitting having a nominal diameter of 4 inches and a thickness of 0.237 inch, may comprise 8 layers, 8 turns per layer, the conductor of each layer consisting of hollow rectangular copper tubing 0.062 inch in thickness with the greater cross-sectional dimension 0.50 inch and the other dimension 0.30 inch. A coil of this character, when connected to a 440-volt 60-cycle source of alternating-current supply will have current flowing therethrough of 2200 amperes (root mean square). The ampere turns will be 140,800. The magneto-motive force will be exceedingly high and adequate to produce a flux density within the cylindrical area of the tube blank 14a between the respective sides of the preheat coil 57, such that the current flowing circumferentially of the narrow band or cylinder of the tube blank 14a will be adequate to raise the temperature of the tube blank from 70° F. to approximately 1100° F. when moving through the coil at the rate of 40 inches per minute.

The temperature of the tube blank 14a, Fig. 3, as it leaves the preheat coil will be safely below its plastic range, thus minimizing any tendency toward deformation of the tube blank prior to its engagement with the shaping section of the mandrel.

Cooperating with such a preheat coil 57 as set forth in the preceding paragraphs may be a mandrel coil 51 having from 42 to 49 turns formed by a conductor having the same dimensions as those of the aforesaid preheat coil. The difference in the number of turns as between the two coils will insure the desired division of heat load between them. The current taken by the mandrel coil 51 will in general be greater than that of the preheat coil and its efficiency will be somewhat lower than that of the preheat coil. With the tube blank 14a and those following it passing through the mandrel coil 51 at the rate of 40 inches per minute, the temperature will be increased from 1100° F. to within an approximate range of from 1400° F. to 1600° F., its plastic range for passage of the tube blank over the enlarged forming section.

If it is desired to increase the power input from either or both of the coils 51 and 57, the applied voltage may be increased or the number of turns for each coil may be decreased.

It will be observed that in Fig. 5 the mandrel coil 51 is located with the plane of the coil or the plane of the respective turns generally normal to the axis of the mandrel and the tube blank 14b, while in Figs. 3 and 4 the mandrel coil 51 is shown tilted or inclined so that the upper half of the coil embraces a greater amount of the enlarged portion of the mandrel. In operation, the distribution of heat in the tube blank 14a may be controlled to some degree by changing the inclination of the mandrel coil 51. Its position will be selected so that the portion of the tube blank 14a as it engages the enlarged section of the mandrel will be within its plastic range. The net result of this adjustment is that additional heat is generated within the tube blank in that portion extending over the enlarged section of the mandrel. This will be self-evident by comparing the amount of overlap of the coil 51 when in the position viewed in Fig. 3, with the amount of overlap with respect to the enlarged portion of the mandrel 12 with the plane of the coil 51 vertical.

In forming tube bends in accordance with the method and apparatus described, it was found that a high degree of uniformity in the dimensions was obtained. There was also a substantial saving in the required lengths of each tube blank. For tube blanks 3½ inches in diameter formed into return bands of 180°, the initial lengths of the tube blanks could be reduced approximately 1 inch over those required in the gas-fired furnaces. This represents a saving of 3½ per cent in raw material. The fewer rejects produced in accordance with the present system indicate a further saving of another 4 per cent in raw material. These savings are over and above the greatly increased production where high speed operation may be maintained as compared with the relatively low speed production obtainable with gas-fired furnaces. The saving per day in the starting-up time is appreciable and means that the efficiency of the process in units produced per day is much higher and the working conditions are greatly improved by the elimination of the long gas flames which have characterized prior practice. These many advantages have been found greatly to offset the somewhat higher cost of electrical generation of heat as compared with gas-fired furnaces.

It might at first appear that the results secured in accordance with the present invention are in fact impossible for the reason that the 60-cycle alternating magnetic flux not only cuts the tube blank 14a but also cuts or passes through the mandrel 12. Under these conditions, heat would of course be generated in the mandrel itself. Practically the only way that heat can leave the mandrel is by conduction to the tube blank, which indicates that the highest temperature of the mandrel 12 must be along the axis thereof in order that there be a mean temperature difference to insure the outward flow of heat.

In accordance with the invention, it was found that the mandrel temperature was but slightly higher than that of the tube blanks, due to phenomena which limited the delivery of energy to the mandrel and insured that the operating temperature of the mandrel remained low enough for it to retain its needed strength for formation of the tube bends. More specifically, it was found that for temperatures of the tube blank below the Curie point, current impulses of large magnitude are induced in the tube blank by reason of the very rapid rate of change of the magnetic flux in the steel. Since, as already indicated, the intensity or density of the magnetic flux is exceedingly high, in fact far higher than is used in any other type of alternating-current transformer, the change from its high positive value in one direction to its high negative value in the opposite direction occurs at such a high rate that there is induced in the tube blanks 14a and 14b, particularly in the outer layers or outer thickness thereof, an abnormally high current impulse. The abnormally high current impulses which flow circumferentially within the restricted length of the tube blank located within each coil not only generate the desired heat but they also simultaneously produce a shielding effect which materially restricts the inductive heating of the mandrel 12 disposed within the tube blank. This rate of change of the magnetic flux of exceedingly high magnitude from its peak values, and particularly as it goes through zero, is extremely high. The effect is analogous and similar to the shielding effect obtainable with higher frequencies. It not only increases the power input to the tube blank, but it produces a desirable shielding effect which makes possible the transfer to the tube blanks of the large amounts of power rapidly and uniformly to heat them without overheating of the mandrel 12.

With the foregoing understanding of the invention it is to be understood that coils of different internal diameter will be used for shaping tube blanks of different sizes, which may vary from around 2½ inches in diameter to as large as may be desired.

For tubes having outside diameters less than 2½ inches, the space available for the mandrel coil is materially limited. For such cases, it will be desirable to utilize alternating currents of higher frequency. By increasing the frequency, the amount of heating current induced in the tube blank may be increased for a given number of turns in the mandrel coil. Any suitable frequency changing apparatus may be utilized, such as inductive frequency multipliers or frequency changers of the motor generator type, mercury arc rectifiers, spark gaps, or thermionic equipment. For the smaller tubes, the preheat coil may be supplied from a 60-cycle alternating-current source or both the preheat coil and the mandrel coil may be supplied from a source of higher frequency, for example 360 cycles per second to 10,000 cycles per second, to some degree depending upon the thickness of the tube to be formed. Due to the cost of the generating equipment, the frequency should be maintained as low as possible for induction of the required heating current. Since the induced electromotive force in the tube blank is directly proportional to the flux and to the frequency, the preferred frequency for a given application may be readily determined. Of course, higher frequencies may also be utilized for the formation of tube blanks of any size, though the economy of installation and maintenance costs for the 60-cycle source of current which may be utilized in accordance with the present invention make it the most desirable frequency in commercial operations.

The mandrel coil may be wound or formed into shapes other than illustrated in Figs. 3, 4 and 5. For example, in Fig. 10, the mandrel coil 130 may be of a frusto-toroidal shape formed by oval conductors wound to produce a coil having a gradually increasing diameter in the direction of travel of the tube blanks. As shown, the configuration of the coil including the oval shaped opening therethrough provides for minimum spacing between its inner heat-and-electrically-insulated surface and the tube blank 14b. The coil 130 consists of an inner coil of two layers 131 and 132, and a second coil of three layers 133, 134, and 135. As shown in Fig. 11, the end of the layer 131 is flow-connected through a rubber tube 136 to a source of cooling water. The other end of the inner coil, the layer 132, is flow-connected to a rubber tube 137 which provides for exit of cooling water from the inner coil. The outer three layers are serially connected, water entering through a tube 138 and flowing outwardly therefrom through a rubber tube 139. The two coils are electrically connected in series by means of a strap 140. The mandrel coil 130 is provided with 25 turns and the preheat coil 141 is provided with 64 turns, each of which is formed of flattened cylindrical tubing, each turn being insulated from the adjacent turn. The respective turns and layers may be flow-connected and electrically connected in the same manner as the coil 57 of Figs. 5 and 6. Alternatively, of course, all layers of the preheat coil 141 may be flow-connected in parallel with each other, or in some cases it may be desirable electrically to connect some of the layers in parallel with each other. Modifications of this character will suggest themselves to those skilled in the art, depending upon the particular application of the invention.

It has already been suggested that the invention is applicable to the fabrication of pipe bends of differing diameter. As a further guide in practicing the invention, the preheat coils hereinafter described may be made of copper tubing having an initial outside diameter of one-half inch and flattened into an oval shape 0.3 of an inch across the minor axis and around 0.5 inch across the major axis. Such a preheat coil of 72 turns and a mandrel coil of 54 turns formed from copper tubing having an original diameter of 0.375 inch may be utilized for tube blanks 2½ inches in diameter. When energized from a 60-cycle alternating-current source of supply with an applied voltage of 440 volts, the power input to the preheat coil will be approximately 166 kilowatts and the power input to the mandrel coil will be approximately 82 kilowatts. The speed of operation will be around 40 inches per minute. The same coils may also be used for tube blanks 3 inches in diameter. For the 3½ to 4-inch tube blanks the coils illustrated in Fig. 5 may be utilized, both being constructed of one-half inch tubing flattened into the same oval shape as the preheat coil. The power input to the preheat coil will be in the neighborhood of 148 kilowatts, while the power to the mandrel coil will be in the neighborhood of 74 kilowatts. For the 5-inch tube blank, the preheat coil will preferably be provided with 56 turns, with 40 turns of similar tubing for the mandrel coil. The power input will be 174 kilowatts to the preheat coil and 86 kilowatts to the mandrel coil. The same mandrel coil may be utilized for the 6-inch tube blanks, though the preheat coil will preferably consist of 48 turns for a power input thereto of 189 kilowatts. For tube blanks 8 inches in diameter, a 48-turn preheat coil is preferably utilized for a power input of 252 kilowatts, while the mandrel coil will consist of 35 turns for a power input of 126 kilowatts. It is to be noted that for the 8-inch size of tube blank the speed in inches per minute will be around 25 instead of the 40 which may be attained with the specified coils for the tube blanks of similar size.

Again referring to Fig. 4, it will be seen that the laminations 81 around the preheat coil 57 and the laminations 82 around the mandrel coil 51 respectively surround but a part of the coils. Though the laminations 81 might extend throughout the circumference of the coil 57, such an arrangement will not always be feasible with respect to the mandrel coil 51 due to the curvature of the tube fitting or return bend. By restricting the location of the laminations to a selected circumferential part of the coil, the intensity of the magnetic flux in the tube blank adjacent such selected part will be greater than in the remainder of the tube blank. This will produce heating currents of greater magnitude and consequently higher temperatures in the selected portion of the tube blank than in the remaining portion thereof. Specifically, in Fig. 4, the laminations 81 and 82 will produce higher temperatures in that region of the tube blank which is eventually characterized by a curvature of larger radius than in the inner portion thereof. Should more equalized heating be desired in the region of the mandrel 12, with the laminations, the laminations 82 may be made longer to extend outwardly from one or both sides of the coil 51 so as to extend the magnetic field beyond the sides of the coil and thus distribute it over a greater area and volume of the tube blank 14a. Similarly, if an unequal heating pattern is desired, the laminations 81 may closely surround one part of the coil 57 while other laminations (not shown) of greater length may surround another portion of the coil 57 to distribute the magnetic field over a greater area of the tube blank. The result will be that the tube blank where the intensity of the magnetic field is greater per unit volume will be heated to correspondingly higher temperatures. Thus it will be seen that in accordance with the present invention many beneficial heat patterns may be obtained. Moreover, this heat pattern will be constant and not subject to variables which require constant adjustment. The heat pattern will be determined by the selected disposition and dimensions of the coil and of the associated laminations.

Where it is desired to produce a higher temperature along the inner side of the mandrel, particularly in that portion of the tube blank of smaller radius, an arrangement like or similar to that of Fig. 10 may be utilized. It will be seen that the outer portion of the mandrel coil 130 is materially wider than the portion disposed adjacent the inner side of the mandrel 12. In consequence, the intensity of the magnetic field is not uniform circumferentially of the tube blank but the intensity in the tube blank varies with the change in the axial distance between the two sides of the coil. The result is that higher temperatures are developed along the inner side of the tube blank where the magnetic field is concentrated in a smaller volume of the tube blank and that the temperatures are lower where the magnetic field passes through a larger volume of the tube blank, or in terms of the heating current, the temperature rise will be higher where the current density is greater.

In Fig. 12, a coil 150 has been illustrated with the turns along the outer portion of the tube blank spaced relatively far apart while those turns as they encircle the inner portion of the tube blank are spaced close together. Such an arrangement for a given coil, such as the coil 150, provides higher temperatures in the region or zone of minimum coil width.

In Fig. 13, the disposition of the heating coil 151 is substantially the reverse of the coil 150 to illustrate how a heat pattern may be established for development of higher temperatures along the outer portion of a tube blank 152 and along that portion of the blank where the coil is of lesser width.

While the coils may be wound in any desired manner, one simple way of providing the desired heat pattern may be obtained by the use of spirally wound coils, of the pancake type, where one-half of the coils, or some other fraction, are bent outwardly. In Fig. 14, the upper left-hand turns 153 are spaced outwardly from the center turns 154 while the upper half of the right-hand turns 155 are also bent outwardly from the center turns 154. Insulating spacers 156 and 157 may be provided to assist in anchoring the respective turns in fixed positions.

While typical and suggestive examples of construction have been set forth together with suggested designs and operating data for particular materials, it is to be understood that the invention is not limited thereto and that other modifications and operating conditions may be utilized for the same or different materials without departing from the scope of the invention as set forth in the appended claims.

What is claimed is:

1. The method of forming a hollow metal article by relative movement with respect to a mandrel which consists in producing an alternating magnetic field through such article in the region of the mandrel of intensity adequate to induce a flow in and around said article of heating current uniformly to elevate the temperature of the article circumferentially thereof to within a predetermined plastic range below a welding temperature and simultaneously relatively moving the article with respect to the mandrel to shape it into a desired pattern and at a rate which limits further rise in temperature of the shaped article.

2. The method of forming metal articles to a predetermined pattern by forcing them over a mandrel which consists in preheating each article to a temperature below its plastic range, producing an alternating magnetic field localized in the region of the mandrel and of intensity adequate rapidly to induce a heating current around said article to elevate the temperature of each article to within said plastic range and relatively moving each article with respect to the mandrel simultaneously to expand the article and uniformly to curve the walls to said desired pattern while maintaining substantially uniform the wall thickness thereof and at a rate which limits further rise in temperature of the shaped pattern.

3. The method of forming a hollow metal article by relative movement with respect to a mandrel having a metal shaping region, which consists in producing an alternating magnetic field through such article in the region of the mandrel of intensity adequate to induce circumferentially of said article a heating current along a path of limited length axially of said mandrel to elevate at high rate the temperature of said article in the metal shaping region of said mandrel to within a predetermined plastic range and simultaneously relatively moving said article with respect to said mandrel to shape it into a desired pattern and at a speed which limits further rise in temperature of the article after passage beyond said metal shaping region.

4. The method of shaping hollow metal articles into a predetermined desired pattern by forcing them over a mandrel which consists in producing an alternating magnetic field in the region of the mandrel of intensity and penetrating power adequate rapidly to elevate the temperature of each article to within a predetermined plastic range around 1600° F., utilizing said field to maintain the temperature of the mandrel slightly above that of the article, and simultaneously relatively moving each article with respect to the mandrel to impart to said article a shape conforming with said predetermined pattern and at a speed which limits further rise in temperature of the shaped article.

5. The method of shaping hollow articles which comprises moving each article in turn toward and over the shaping section of a mandrel, subjecting each article while immediately in advance of said section to an alternating magnetic field of high intensity to elevate the temperature of said article, and subjecting the article while passing over said section to a second alternating magnetic field of sufficiently high intensity further to raise its temperature to within its desired plastic range and to maintain it at that temperature.

6. The method of shaping ferromagnetic hollow articles which comprises moving each article in turn toward and over the shaping section of a mandrel, subjecting each article while immediately in advance of said section to an intense alternating magnetic field to elevate its temperature, and subjecting the article while passing over said section to an alternating magnetic field of sufficient intensity further to raise and to maintain its temperature within its plastic range.

7. In combination, a curved mandrel of variable cross section area for shaping cylindrical tube blanks into tube bends and an electromagnetic mandrel coil encircling said mandrel in the region first to be engaged by a tube blank, said coil having a gradually increasing inner diameter in the direction of the mandrel, an electromagnetic preheat coil spaced from said first-named coil, means for forcing tube blanks over said mandrel, and means for energizing said coils for preheating each tube blank as it approaches said mandrel and for thereafter elevating its temperature to within its plastic range as each tube blank is forced over the curved and larger cross-sectional area of said mandrel.

8. The method of producing uniformly curved tubular fittings from cylindrical tube blanks by means of a curved bending mandrel which consists in relatively moving tube blanks with respect to said mandrel to force them in succession over said mandrel while continuously heating each said tube blank to a temperature within its plastic range by alternating current induced therein during the shaping of each said tube blank by said mandrel.

9. The method of producing at high rate uniformly curved tubular fittings from cylindrical tube blanks of ferromagnetic material by means of a curved bending and shaping mandrel which consists in relatively moving tube blanks with respect to said mandrel to force them in succession thereover while continuously heating each said tube blank to a temperature within its plastic range by low frequency alternating current induction of intensity adequate to produce by the rate of change of the magnetic flux with reference to the tube blank a large impulse of heating current in said tube blank each time said magnetic flux passes through zero, the rate of change of said flux then being much greater than during the remaining part of each cycle.

10. The method of shaping cylindrical tube blanks into curved tube fittings by relative movement of each tube blank over a mandrel which consists in generating heat in the wall of the tube blank by applying an alternating flux through the axial length of each tube blank in engagement with the mandrel, said flux having a density adequate to elevate and to maintain the temperature of the article to within a predetermined plastic range.

11. A system of shaping tube blanks which comprises a mandrel over which said tube blanks are forced, a heating coil encircling said mandrel in the region first engaged by a tube blank and consisting of a plurality of layers, each layer consisting of a conductor having a plurality of turns, means for energizing said coil with alternating current having a frequency of around 60 cycles per second and of magnitude for inductively producing heat within the tube blank and the mandrel rapidly to elevate the temperature of each tube blank to within its plastic range, and means individual to each said layer for passing a stream of a coolant therethrough.

12. In combination, a mandrel of variable cross-sectional area for shaping tube blanks, an electromagnetic coil encircling said mandrel in the region first to be enaged by a tube blank, said coil being formed of hollow helically-wound conductors to provide for said coil a gradually increasing inner diameter in the direction of the curved portion of said mandrel to provide uniform spacing therebetween, means for passing a stream of coolant through each of said helically-wound conductors, and means for electrically connecting said helically-wound conductors to a source of alternating-current supply.

13. The method of forming a hollow metal article by relative movement with respect to a mandrel which consists in producing an alternating magnetic field in an axial direction through such article in the region of the mandrel of density adequate to induce circumferentially of said article a heating current along a path of limited length axially of said mandrel to elevate at high rate the temperature of said article in the metal shaping region of said mandrel to within a predetermined plastic range, causing said alternating magnetic flux simultaneously to cut through different axial lengths of said article to develop a predetermined heat pattern where the temperatures differ circumferentially of the metal article, and simultaneously relatively moving said article with respect to said mandrel to shape it into a desired pattern and at a speed which limits further rise in temperature of the article after passage beyond said metal shaping region.

14. A system of shaping cylindrical tube blanks into curved tubular fittings which comprises a mandrel which, along a predetermined curved portion thereof, is of gradually increasing cross-sectional area for expanding and curving the tube blanks, means for progressively forcing said tube blanks over said mandrel, a heating coil consisting of a plurality of layers, each layer consisting of a conductor having a plurality of turns, means supporting said heating coil in encircling relation with at least that part of the mandrel first engaged by a tube blank and in the region of said gradually increasing cross-sectional area thereof, means for energizing said coil with alternating current having a frequency of around 60 cycles per second and of magnitude for inductively producing heat within the increasing cross-sectional area of said mandrel and within and circumferentially of the tube blank in engagement therewith rapidly to elevate to within its plastic range the temperature of that circumferential portion of said tube blank which is progressively forced along the region of the increasing cross-sectional area of said mandrel, and means individual to selected layers of said coil for passing a stream of a coolant therethrough.

EDWARD BENNETT.

REFERENCES CITED

The following references are of record in the file of this patent:

UNITED STATES PATENTS

| Number | Name | Date |
| --- | --- | --- |
| 1,279,313 | Finine | Sept. 17, 1918 |
| 1,365,198 | Sessions | Jan. 11, 1921 |
| 1,646,498 | Seede | Oct. 25, 1927 |
| 1,941,526 | Adams | Jan. 2, 1934 |
| 1,958,447 | Quartz et al. | May 15, 1934 |
| 1,980,875 | Northrup | Nov. 13, 1934 |
| 1,987,458 | Adams | Jan. 8, 1935 |
| 2,182,819 | Pisarev | Dec. 12, 1939 |
| 2,303,408 | Soderholm | Dec. 1, 1942 |
| 2,345,670 | Heath | Apr. 4, 1944 |
| 2,349,569 | Wilson | May 23, 1944 |